United States Patent [19]
Totten et al.

[11] Patent Number: 5,220,960
[45] Date of Patent: Jun. 22, 1993

[54] RETARDED ACID SOLUBLE WELL CEMENT COMPOSITIONS AND METHODS

[75] Inventors: Patty L. Totten; Bobby G. Brake; Edward F. Vinson, all of Duncan, Okla.

[73] Assignee: Halliburton Company, Duncan, Okla.

[21] Appl. No.: 923,391

[22] Filed: Jul. 31, 1992

Related U.S. Application Data

[63] Continuation-in-part of Ser. No. 838,632, Feb. 19, 1992.

[51] Int. Cl.⁵ .................................. E21B 33/138
[52] U.S. Cl. .............................. 166/293; 106/687; 166/281
[58] Field of Search .................. 166/281, 292, 293; 106/686, 687, 688

[56] References Cited

U.S. PATENT DOCUMENTS

| | | | |
|---|---|---|---|
| 2,598,980 | 6/1952 | Denning. | |
| 2,702,753 | 2/1955 | Dickey. | |
| 3,516,496 | 6/1970 | Barkman, Jr. et al. | 166/295 X |
| 3,573,941 | 4/1971 | Edwards et al. | 252/307 X |
| 3,662,830 | 5/1972 | Martin | 166/293 |
| 3,701,384 | 10/1972 | Routson et al. | 166/273 X |
| 3,778,304 | 12/1973 | Thompson. | |
| 3,816,148 | 6/1974 | Barthel | 166/293 X |
| 3,887,009 | 6/1975 | Miller et al. | 166/292 |
| 4,137,093 | 1/1979 | Poblano | 166/293 X |
| 4,210,455 | 7/1980 | Metcalf et al. | 166/293 X |
| 4,300,633 | 11/1981 | Stewart | 166/250 |
| 4,415,366 | 11/1983 | Copening | 166/293 X |
| 4,466,833 | 8/1984 | Spangle | 166/293 X |
| 4,676,318 | 6/1987 | Myers et al. | 166/293 |
| 5,133,409 | 7/1992 | Bour et al. | 166/293 |

*Primary Examiner*—George A. Suchfield
*Attorney, Agent, or Firm*—Thomas R. Weaver; C. Clark Dougherty, Jr.

[57] ABSTRACT

Retarded acid soluble well cement compositions which set into hard substantially impermeable masses and methods of using such compositions for forming removable cement plugs or seals in subterranean zones are provided. The compositions are comprised of magnesium oxychloride cement and a set retarder comprised of a water soluble borate and a sugar.

6 Claims, No Drawings

RETARDED ACID SOLUBLE WELL CEMENT COMPOSITIONS AND METHODS

CROSS-REFERENCES TO RELATED APPLICATIONS

This application is a continuation-in-part of Ser. No. 07/838,632 filed Feb. 19, 1992.

BACKGROUND OF THE INVENTION

1. Field of the Invention

The present invention relates to retarded acid soluble magnesium oxychloride cement compositions and methods of utilizing such compositions for temporarily plugging or sealing subterranean zones.

2. Description of the Prior Art

In the drilling and completion of well bores penetrating subterranean formations containing hydrocarbons, voids and other highly permeable zones within the formations are often encountered. Such zones can cause a variety of problems including the loss of expensive drilling or completion fluids thereinto. Heretofore, lost circulation treatments involving various plugging materials such as walnut hulls, mica and cellophane have been used to prevent or lessen the loss of fluids from well bores. The disadvantages of such treatments include the potential for damage to hydrocarbon bearing formations as a result of the inability to remove the plugging materials therefrom, and the dislodgement of the plugging materials from highly permeable zones whereby fluid losses subsequently resume.

A more preferred technique for preventing lost circulation problems has been to temporarily plug voids or permeable zones with magnesium oxychloride cement compositions. Solid magnesium oxychloride cements can be removed with minimal damage to hydrocarbon bearing zones or formations by dissolution in acids. However, prior set retarded magnesium oxychloride cement compositions utilized in well drilling and completion applications have had relatively short thickening times, particularly at temperatures approaching 220° F. As a result, prior retarded magnesium oxychloride cement compositions often can not be placed in a deep and/or hot subterranean zone before becoming too thick to pump.

Thus, there is a need for improved retarded acid soluble magnesium oxychloride cement compositions and methods whereby removable plugs or seals can be formed in relatively deep and/or hot subterranean zones therewith.

SUMMARY OF THE INVENTION

By the present invention improved removable set retarded magnesium oxychloride well cement compositions and methods are provided which overcome the shortcomings of the prior art and meet the need recited above. The compositions are basically comprised of magnesium oxide, an aqueous magnesium chloride solution and a set retarder comprised of a water soluble borate and a sugar selected from the group consisting of sucrose, lactose and dextrose. The thickening times of the compositions are sufficiently long to pump the compositions into deep, high temperature subterranean zones prior to appreciably thickening. The compositions set into hard substantially impermeable masses which can be permanently left in the subterranean zones or removed therefrom by dissolution in acid.

Methods of using the improved set retarded cement compositions of this invention for forming removable cement plugs or seals in subterranean zones are also provided.

It is, therefore, a general object of the present invention to provide improved retarded acid soluble well cement compositions and methods.

Other and further objects, features and advantages of the present invention will be readily apparent to those skilled in the art upon a reading of the description of preferred embodiments which follows.

DESCRIPTION OF PREFERRED EMBODIMENTS

The improved set retarded magnesium oxychloride cement compositions of this invention are operable over a broad temperature range, i.e., they have thickening times in the range of from about 15 minutes to about 390 minutes and set into hard substantially impermeable masses at temperatures ranging from about 80° F. to 220° F. and higher. The cement compositions can range in density from a high of about 19.0 pounds per gallon to a low of about 6.0 pounds per gallon. The lower density compositions are foamed, and the particular density of a foamed composition is controlled by the particular amount of gas entrained therein. Once placed in subterranean zones to seal or plug the zones or for other purposes, the cement compositions can be permanently left in the zones or they can be removed by dissolution in acids.

The set retarded acid soluble well cement compositions of this invention are basically comprised of magnesium oxide, an aqueous magnesium chloride solution and a set retarder comprised of a water soluble borate and a sugar selected from the group consisting of sucrose, lactose and dextrose. In addition, the compositions can include acid soluble fillers and, as mentioned above, gases entrained therein to lower the densities to desired levels.

The mixture of magnesium oxide and aqueous magnesium chloride solution forms magnesium oxychloride cement (also known as Sorel cement) which solidifies into a substantially impermeable acid soluble mass in a relatively short period of time. For example, a magnesium oxychloride cement containing a 5:1:13 molar ratio of magnesium oxide, magnesium chloride and water, respectively, has a thickening time at 140° F. of about 120 minutes and a thickening time at 200° F. of about 35 minutes. The thickening time referred to herein is the length of time a given cement composition remains in a fluid state under specific conditions. Thickening time tests are prescribed in Sections 8 and 9 of *Specification for Materials and Testing for Well Cements*, API Spec. 10, 5th Edition dated Jul. 1, 1990, of the American Petroleum Institute.

The magnesium oxide useful in accordance with this invention is that formed from magnesite, magnesium carbonate or synthetic magnesium hydroxide by high temperature calcination. Generally, for cement compositions of this invention which must set at temperatures in the range of from about 80° F. to about 120° F., the magnesium oxide is calcined at temperatures below about 2642° F. For set temperatures in the range of from about 120° F. to 220° F. and higher, magnesium oxide calcined at temperatures higher than about 2642° F. is used.

Generally, an aqueous magnesium chloride solution containing magnesium chloride in an amount of from about 25% to about 34% by weight of solution is combined with the magnesium oxide in an amount in the range of from about 0.05 gallon to about 0.3 gallon per pound of magnesium oxide. The resulting nonfoamed slurry has a density in the range of from about 11.8 pounds per gallon to about 18.5 pounds per gallon and is pumpable, i.e., prior to thickening it can be pumped by way of the well bore or a conduit disposed therein into a subterranean zone to be cemented.

The cement compositions, and particularly foamed compositions, can also include an acid soluble filler combined therewith in an amount up to about 4 pounds per pound of magnesium oxide. Examples of acid soluble fillers which can be utilized are ground dolomite, ground magnesium carbonate and ground calcium carbonate, with ground calcium carbonate being the most preferred. The increased consistency provided by the presence of such a filler in the cement compositions allows the compositions to be more easily foamed and yields higher quality foamed slurries.

In order to lengthen the thickening times of the cement compositions of this invention whereby the cement compositions can be pumped into a well bore and placed in a desired zone therein prior to when the cement compositions thicken and set, a set retarder is included in the compositions. The set retarder is comprised of a water soluble borate and a sugar selected from the group consisting of sucrose, lactose and dextrose. A variety of water soluble borates can be utilized including those selected from the group consisting of sodium, potassium, lithium and ammonium pentaborates, tetraborates, octaborates, biborates and boric acid. The most preferred water soluble borate for use in accordance with this invention is disodium octaborate tetrahydrate.

The water soluble borate utilized is included in a magnesium oxychloride cement composition of this invention in an amount up to about 0.10 pounds per pound of magnesium oxide in the composition. While the presence of the water soluble borate retards the setting of the cement composition (lengthens the thickening time) by itself to some degree, the retardation is increased to a longer often required thickening time when a sugar selected from the group consisting of sucrose, lactose and dextrose is also included in the composition. Generally, the sugar is included in the composition in an amount up to about 0.08 pounds per pound of magnesium oxide therein.

The magnesium oxychloride cement compositions preferably include a set retarder comprised of a water soluble borate and sucrose, lactose or dextrose sugar in amounts whereby the water soluble borate is present in an amount up to about 0.10 pounds per pound of magnesium oxide, most preferably about 0.02 to about 0.08 pounds per pound of magnesium oxide, and the sugar is present in an amount up to about 0.08 pounds per pound of magnesium oxide, most preferably about 0.01 to about 0.06 pounds per pound of magnesium oxide. Preferred such set retarded cement compositions have thickening times in the range of from about 120 minutes to about 360 minutes and higher depending upon the water soluble borate and sugar used, the amounts thereof and the temperature of the cement composition as will be illustrated in the examples which follow.

As mentioned, in order to reduce the density of a composition of this invention, a gas is entrained in the composition. The gas utilized can be any gas which does not adversely react with components in the cement composition or in the subterranean formations or zones contacted by the cement composition. Preferably, the gas is selected from air or nitrogen, with nitrogen being the most preferred from the standpoint of economy and ease of mixing. The gas utilized is entrained in the cement slurry in an amount sufficient to lower the density of the cement slurry to a desired level, e.g., to a level in the range of from about 6 pounds per gallon to about 13.0 pounds per gallon.

To facilitate the foaming of the cement composition and to maintain the entrainment of the gas in the cement composition after it has been foamed, a foaming agent and foam stabilizer are preferably included in the cement composition. A variety of foaming agents can be used which function to cause the gas to readily disperse in the form of small bubbles throughout the cement slurry. Examples of such foaming agents are alcohol sulfates, ethoxylated alcohol sulfates and salts thereof. Generally, a sulfated $C_6$ to $C_{15}$ alkyl alcohol ethoxylated with 2 to about 10 moles of ethylene oxide per mole or a salt thereof is preferred. Of these, the sodium salts of $C_6$ to $C_{10}$ alkyl alcohol ethoxylate sulfates with an average of about 3 moles of ethylene oxide per mole are preferred.

The foaming agent utilized is generally added to the cement composition in an amount in the range of from about 1% to about 5% by weight of the aqueous magnesium chloride solution therein. A more preferred amount of foaming agent is in the range of from about 1% to about 4% by weight of th aqueous magnesium chloride solution in the composition. When the sodium salt of a sulfated $C_6$ to $C_{10}$ alkyl alcohol ethoxylated with an average of 3 moles of ethylene oxide is utilized, it is preferably included in the cement slurry in an amount of about 3% by weight of the aqueous magnesium chloride solution therein.

The foam stabilizer functions to maintain the dispersion of the gas bubbles throughout the cement composition for the period of time required for the cement composition to be placed in a subterranean zone and set into a hard substantially impermeable mass. Foam stabilizers which can be utilized include surfactants of the fatty amine betaines. Of these, cocoamine betaine is preferred. The foam stabilizer is generally included in the cement composition in an amount in the range of from about 0.5% to about 2.5% by weight of aqueous magnesium chloride solution therein. A more preferred range is from about 0.5% to about 2.0% by weight of the aqueous magnesium chloride solution in the composition. When cocoamine betaine is utilized, it is preferably included in the composition in an amount of about 0.75% by weight of aqueous magnesium chloride solution in the composition.

As will be understood by those skilled in the art, instead of separate foaming agent and foam stabilizer, it is possible to utilize a single surface active compound which functions as both a dispersant for facilitating the formation of foam and a foam stabilizer for maintaining the cement composition in the foamed state. In addition, other additives well known to those skilled in the art can be included in the cement compositions such as fluid loss control additives and the like.

A preferred set retarded acid soluble well cement composition of this invention is comprised of a slurry of magnesium oxide, a 27% to 32% by weight aqueous magnesium chloride solution present in an amount in the range of from about 0.15 gallon to about 0.25 gallon per pound of magnesium oxide, an acid soluble solid filler present in an amount up to about 4 pounds per pound of magnesium oxide and a set retarder comprised of a water soluble borate present in an amount up to about 0.08 pounds per pound of magnesium oxide and a sugar selected from the group consisting of sucrose, lactose and dextrose present in an amount up to about 0.06 pounds per pound of magnesium oxide. The resulting nonfoamed slurry has a density in the range of from about 13.0 pounds per gallon to about 18.0 pounds per gallon. When this composition is subjected to temperatures less than about 120° F., the solid filler does not necessarily have to be present therein.

A preferred low density acid soluble well cement composition of this invention is comprised of a slurry of magnesium oxide, a 27% to 32% by weight aqueous magnesium chloride solution present in an amount in the range of from about 0.15 gallon to about 0.25 gallon per pound of magnesium oxide, an acid soluble solid filler present in an amount in the range of from about 1.0 pound to about 3 pounds per pound of magnesium oxide, a set retarder comprised of a water soluble borate present in an amount up to about 0.08 pounds per pound of magnesium oxide and a sugar selected from the group consisting of sucrose, lactose and dextrose present in an amount up to about 0.06 pounds per pound of magnesium oxide, a foaming agent selected from the group consisting of ethoxylated alkyl alcohol sulfates wherein the sulfated alcohol is a $C_6$ to $C_{10}$ alkyl alcohol ethoxylated with an average of about 3 moles of ethylene oxide per mole present in the slurry in an amount in the range of from about 1% to about 4% by weight of the aqueous magnesium chloride solution in the slurry, a foam stabilizer comprised of cocoamine betaine present in an amount in the range of from about 0.5% to about 2% by weight of the magnesium chloride solution and a gas entrained in the slurry in an amount sufficient to obtain a desired low slurry density. The resulting foamed slurry can have a density in the range of from about 6.0 pounds per gallon to about 13.0 pounds per gallon.

The most preferred non-foamed cement composition of the present invention is comprised of a pumpable slurry of magnesium oxide, a 27% by weight aqueous magnesium chloride solution present in an amount of about 0.16 gallon per pound of magnesium oxide, calcium carbonate filler present in an amount of about 0.7 to 3 pounds per pound of magnesium oxide and a set retarder comprised of disodium octaborate tetrahydrate present in an amount up to about 0.08 pounds per pound of magnesium oxide and lactose present in an amount up to about 0.06 pound per pound of magnesium oxide.

The most preferred foamed composition of this invention is comprised of a pumpable slurry of magnesium oxide, a 27% by weight aqueous magnesium chloride solution present in an amount of about 0.16 gallon per pound of magnesium oxide, calcium carbonate filler present in an amount of about 1.4 to 4 pounds per pound of magnesium oxide, a set retarder comprised of disodium octaborate tetrahydrate present in an amount up to about 0.08 pounds per pound of magnesium oxide and lactose present in an amount up to about 0.06 pounds per pound of magnesium oxide, a foaming agent selected from the group consisting of the sodium salts of sulfated $C_6$ to $C_{10}$ alkyl alcohols ethoxylated with an average of about 3 moles of ethylene oxide per mole present in an amount of about 3% by weight of the aqueous magnesium chloride solution in the slurry, a foam stabilizer comprised of cocoamine betaine present in an amount of about 0.75% by weight of the magnesium chloride solution and nitrogen entrained in the slurry in an amount sufficient to obtain a desired slurry density.

In preparing the cement compositions of this invention, it is preferred that the dry components, i.e., the magnesium oxide, filler, set retarder, and the like, are preblended and then mixed with the aqueous solution of magnesium chloride while agitating or stirring the mixture. When the slurry is foamed, the foaming agent and foam stabilizer are next combined with the slurry, and the slurry is foamed by entraining gas therein using conventional static or continuous foaming apparatus. For example, when air is utilized, a high speed atmospheric static mixer can be used which introduces air into the cement slurry until a predetermined volume of cement slurry having the desired density is produced. When nitrogen is utilized, it can be entrained in the cement slurry continuously by combining the slurry with the nitrogen in a high pressure continuous mixer. In field applications, metered foaming agent and stabilizer can be injected in-line prior to the in-line injection of a metered amount of gas required to obtain the desired downhole density.

In carrying out the methods of the present invention for forming a selectively removable plug or seal in a subterranean zone penetrated by a well bore, an acid soluble cement slurry of the present invention which sets into a hard substantially impermeable mass is pumped into the subterranean zone by way of the well bore and then allowed to set in the zone whereby a plug or seal is formed therein. The substantially impermeable plug or seal formed can be left in the zone permanently, or the plug or seal can be removed. The removal is accomplished by pumping an aqueous acid solution into the zone containing the plug or seal whereby it is contacted with the aqueous acid solution and dissolved therein. While various aqueous acid solutions can be utilized for this purpose, a 15% by weight aqueous hydrochloric acid solution is generally preferred.

In order to further illustrate the cement compositions and methods of the present invention, the following examples are given.

EXAMPLE 1

A number of set retarded acid soluble well cement compositions of the present invention were prepared and tested for thickening times in accordance with API Standard Procedures. That is, the thickening time tests were conducted in accordance with Section 8 of the *Specification for Materials and Testing for Well Cements*, API Spec. 10, published by the American Petroleum Institute, Washington, D.C. A first group of test slurries were prepared containing 0.1576 gallons of a 27% by weight magnesium chloride solution per pound of magnesium oxide. The slurries contained various quantities of set retarder, i.e., disodium octaborate tetrahydrate and/or a sugar (lactose, dextrose or sucrose), and were tested for thickening time at 80° F. and 120° F. BHCT. The results of these tests are set forth in Table I below.

TABLE I

Thickening Time Response Properties at 80° F. and 120° F.
Magnesium Oxychloride Cement,
0.1576 gal. Magnesium Chloride Solution
(27% by weight) per lb Magnesium Oxide

| Temp (°F.) | Disodium Octaborate Tetrahydrate, lb per lb of MgO | Sugar | Sugar, lb per lb of MgO | Thickening Time (Hr:Min) |
|---|---|---|---|---|
| 80 | 0.005 | None | 0.0 | 2:53 |
| 80 | 0.005 | Lactose | 0.06 | 2:44 |
| 80 | 0.005 | Dextrose | 0.06 | 2:40 |
| 80 | 0.005 | Sucrose | 0.06 | 2:20 |
| 80 | 0.0 | Lactose | 0.06 | 2:21 |
| 80 | 0.0 | Dextrose | 0.06 | 2:26 |
| 80 | 0.0 | Sucrose | 0.06 | 2:32 |
| 120 | 0.08 | None | 0.0 | 4:28 |
| 120 | 0.08 | Lactose | 0.06 | 4:30 |
| 120 | 0.08 | Dextrose | 0.06 | 3:58 |
| 120 | 0.08 | Sucrose | 0.06 | 4:28 |

From Table I it can be seen that at temperatures of 120° F. and below, the addition of a sugar to magnesium oxychloride cement containing a water soluble borate does not appreciably affect the thickening time.

EXAMPLE 2

Additional magnesium oxychloride cement compositions were prepared containing 0.1576 gallons of a 27% by weight magnesium chloride solution per pound of magnesium oxide, and in addition, containing 1.5 pounds of ground calcium carbonate filler per pound of magnesium oxide. The compositions also contained various quantities of disodium octaborate tetrahydrate and sugar, and were tested for thickening times at 140° F. BHCT. The results of these tests are set forth in Table II below.

TABLE II

Thickening Time Response Properties at 140° F.
Magnesium Oxychloride Cement,
0.1576 gal Magnesium Chloride Solution
(27% by weight) per lb Magnesium Oxide,
1.5 lb Calcium Carbonate per lb Magnesium Oxide

| Disodium Octaborate Tetrahydrate, lb per lb of MgO | Sugar | Sugar, lb per lb of MgO | Thickening Time (Hr:Min) |
|---|---|---|---|
| 0.0 | None | 0.0 | 1:24 |
| 0.005 | None | 0.0 | 2:40 |
| 0.005 | Sucrose | 0.06 | 3:48 |

From Table II above, it can be seen that at 140° F. the presence of sugar in the magnesium oxychloride cement compositions containing a water soluble borate increased the thickening times of the compositions.

EXAMPLE 3

Additional set retarded magnesium oxychloride cement compositions were prepared containing 0.1576 gallons of 27% by weight magnesium chloride solution per pound of magnesium oxide, 1.5 pounds of ground calcium carbonate filler and various quantities of disodium octaborate tetrahydrate and sugar. The compositions were tested for thickening times at 200° F. The results of these tests are set forth in Table III below.

TABLE III

Thickening Time Response Properties at 200° F.
Magnesium Oxychloride Cement,
0.1576 gal. Magnesium Chloride Solution
(27% by weight) per lb Magnesium Oxide,
1.5 lb Calcium Carbonate per lb Magnesium Oxide

| Disodium Octaborate Tetrahydrate, lb per lb of MgO | Sugar | Sugar, lb per lb of MgO | Thickening Time (Hr:Min) |
|---|---|---|---|
| 0.0 | None | — | 0:30 |
| 0.08 | None | — | 3:05 |
| 0.0 | Lactose | 0.06 | 0:47 |
| 0.0 | Dextrose | 0.06 | 1:48 |
| 0.0 | Sucrose | 0.06 | 0:20 |
| 0.08 | Lactose | 0.06 | 5:56 |
| 0.08 | Dextrose | 0.06 | 5:07 |
| 0.08 | Sucrose | 0.06 | 3:45 |

From Table III it can readily be seen that the combination of water soluble borate and sugar in a magnesium oxychloride cement composition increases the thickening time of the composition appreciably.

EXAMPLE 4

Additional magnesium oxychloride cement compositions were prepared containing 0.1576 gallons of 27% by weight magnesium chloride solution per pound of magnesium oxide, 0.7 pound of ground calcium carbonate filler per pound of magnesium oxide and various quantities of sodium tetraborate decahydrate and sugar. The compositions were tested for thickening times at 200° F. and the results of the tests are given in Table IV below.

TABLE IV

Thickening Time Response Properties at 200° F.
Magnesium Oxychloride Cement,
0.1576 gal. Magnesium Chloride Solution
(27% by weight) per lb Magnesium Oxide,
0.7 lb Calcium Carbonate per lb Magnesium Oxide

| Sodium Tetraborate Decahydrate, lb per lb of MgO | Sugar | Sugar, lb per lb of MgO | Thickening Time (Hr:Min) |
|---|---|---|---|
| 0.0 | None | 0.0 | 0:39 |
| 0.08 | None | 0.0 | 4:33 |
| 0.08 | Lactose | 0.01 | 6:17 |
| 0.08 | Dextrose | 0.01 | 6:10 |
| 0.08 | Sucrose | 0.01 | 5:05 |

From Table IV it can again be seen that the combination of small quantities of water soluble borate and sugar function effectively as a set retarder for magnesium oxychloride cement.

Thus, the present invention is well adapted to carry out the objects and attain the ends and advantages mentioned as well as those which are inherent therein. While numerous changes may suggest themselves to those skilled in the art, such changes are encompassed within the spirit of this invention as defined by the appended claims.

What is claimed is:

1. A method of forming a cement plug or seal in a subterranean zone penetrated by a well bore which can subsequently be removed by dissolution in acid comprising:

pumping a set retarded acid soluble cement composition which sets into a hard substantially impermeable mass into said zone comprised of magnesium oxide, an aqueous magnesium chloride solution and a set retarder comprised of a water soluble borate and a sugar selected from the group consisting of sucrose, lactose and dextrose; and allowing said cement composition to set in said zone.

2. The method of claim 1 wherein said water soluble borate is selected from the group consisting of sodium, potassium, lithium and ammonium pentaborates, tetraborates, octaborates, biborates and boric acid.

3. The method of claim 1 wherein said composition further comprises an acid soluble filler selected from the group consisting of ground calcium carbonate, dolomite and magnesium carbonate.

4. The method of claim 1 wherein said cement composition further comprises a gas entrained in said composition in an amount sufficient to obtain a desired low density.

5. The method of claim wherein said cement composition further comprises a foaming agent selected from the group consisting of alcohol sulfates, ethoxylated alcohol sulfates and salts thereof.

6. The method of claim 5 wherein said cement composition further comprises a foam stabilizer selected from the group consisting of fatty amine betaines.

* * * * *